(12) United States Patent
Camenisch et al.

(10) Patent No.: US 9,847,877 B2
(45) Date of Patent: Dec. 19, 2017

(54) PASSWORD-BASED GENERATION AND MANAGEMENT OF SECRET CRYPTOGRAPHIC KEYS

(71) Applicant: International Business Machines Corporation, Armonk, NY (US)

(72) Inventors: Jan Camenisch, Rueschlikon (CH); Robert Enderlein, Rueschlikon (CH); Stephan Krenn, Rueschlikon (CH); Anja Lehmann, Rueschlikon (CH); Gregory Neven, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 14/835,965

(22) Filed: Aug. 26, 2015

(65) Prior Publication Data
US 2016/0065366 A1    Mar. 3, 2016

(30) Foreign Application Priority Data
Aug. 26, 2014  (GB) .................................. 1415070.0

(51) Int. Cl.
*H04L 9/08*    (2006.01)
(52) U.S. Cl.
CPC .................... *H04L 9/0863* (2013.01)
(58) Field of Classification Search
None
See application file for complete search history.

(56) References Cited

U.S. PATENT DOCUMENTS 6,829,356 B1    12/2004  Ford
7,359,507 B2 *   4/2008  Kaliski ................... H04L 9/085
                                                            380/28
(Continued)

FOREIGN PATENT DOCUMENTS

| CN | 101465735 A | 6/2009 |
|---|---|---|
| CN | 101651666 A | 2/2010 |
| WO | 2007044952 A1 | 4/2007 |

OTHER PUBLICATIONS

Camenisch, Jan, et al., "Practical Yet Universally Composable Two-Server Password-Authenticated Secret Sharing", CCS '12, Oct. 16-18, 2012, Raleigh, North Carolina, USA, Copyright 2012, 12 pgs.

(Continued)

*Primary Examiner* — Dede Zecher
*Assistant Examiner* — Richard A McCoy
(74) *Attorney, Agent, or Firm* — Harrington & Smith (57) ABSTRACT

Methods and apparatus are provided for generating a secret cryptographic key of a user computer connectable to a server via a network. A secret user value is provided at the user computer. A secret server value is provided at the server with a check value which encodes the secret user value and a user password. The user computer encodes the secret user value and an input password to produce a first value corresponding to said check value, and communicates the first value to the server. The server compares the first and the check values to check whether the input password equals the user password. If so, the server encodes the first and the secret server values to produce a second value and communicates the second value to the user computer. The user computer generates the secret cryptographic key by encoding the second value, the input password and the secret user value.

15 Claims, 4 Drawing Sheets

(56) References Cited

U.S. PATENT DOCUMENTS

| | | | |
|---|---|---|---|
| 2002/0141594 A1 | 10/2002 | MacKenzie et al. | |
| 2004/0158715 A1* | 8/2004 | Peyravian | H04L 9/3013 713/171 |
| 2010/0135491 A1* | 6/2010 | Bhuyan | H04L 63/0869 380/247 |
| 2013/0013921 A1* | 1/2013 | Bhathena | H04L 9/0825 713/168 |
| 2014/0189808 A1* | 7/2014 | Mahaffey | H04L 63/0853 726/4 |

OTHER PUBLICATIONS

Katz, Jonathan, et al., "Efficient Password-Authenticated Key Exchange Using Human-Memorable Passwords", Advances in Cryptology, EUROCRYPT 2001, Apr. 15, 2001, vol. 2045, Lecture Notes in Computer Science, 20 pgs.

Canetti, Ran, et al., "Universally Composable Password-Based Key Exchange", Advances in Cryptology, EUROCRYPT 2005, vol. 3494, Lecture Notes in Computer Science, 17 pgs.

Provos, Niels, et al., "A Future-Adaptable Password Scheme", Proceedings of the FREENIX Track: 1999 USENIX Annual Technical Conference, Monterey, CA, USA, Jun. 6-11, 1999, 13 pgs.

Katz, Jonathan, et al., "Two-Server Password-Only Authenticated Key Exchange", Applied Cryptology and Network Security, vol. 3531, Lecture Notes in Computer Science, ACNS 2005, 27 pgs.

Kaliski, B., "PKCS #5: Password-Based Cryptology Specification Version 2.0", RSA Laboratories, Sep. 2000, Network Working Group, Request for Comments: 2898, Category: Informational, 34 pgs.

GB Search Report under Section 17(5), dated Feb. 13, 2015, 3 pgs.

Yeh, Her-tyan et al. "Password-Based User Authentication and Key Distribution Protocols for Client-Server Applications", The Journal of Systems and Software, Jun. 30, 2004 (Jun. 30, 2004) No. 1 vol. 72 ISSN:0164-1212, p. 99, col. 1, paragraph 4, col. 2, paragraph 1-7.

* cited by examiner

PASSWORD-BASED GENERATION AND MANAGEMENT OF SECRET CRYPTOGRAPHIC KEYS

This invention relates generally to password-based generation of secret cryptographic keys. Methods are provided for generating secret cryptographic keys at user computers based on input of user passwords, together with corresponding apparatus and computer programs and key-management applications employing such methods.

Cryptographic keys are used for a variety of purposes on personal user devices such as personal computers, smart phones, tablets and other computer devices. Such keys may be used, for instance, for signing messages, for authenticating the user computer to other devices, or for encryption/decryption of sensitive data stored on the computer. Often the cryptographic key must be secret to the user computer, so that the key is not shared with any other computer which communicates with the user computer. Secure management of such secret keys is problematical. The key should be readily available for the required use but at the same time protected against unauthorised access, e.g. on loss or theft of the user computer. Since users cannot be expected to remember cryptographic keys, use of a secret key stored on a user computer may be subject to input by the user of a valid user password. However, typical user passwords are cryptographically weak and easily guessed by a thief using an efficient offline brute-force attack. Moreover, a user will often use the same or a similar password for other purposes, such as corporate e-mail, so compromise of his password in other contexts can prejudice security of secret keys.

The use of trusted hardware devices, such smart cards or TPM (Trusted Platform Module) chips, has been proposed for secure management of secret keys. However, such devices are not always available and their use adds to expense and system complexity. Other approaches involve dynamic generation of the key at the user computer through communication via a network with one or more servers. The problem of deriving a (strong) cryptographic key from a (weak) password with the help of one or more servers is a well-studied problem in cryptography, e.g. in the context of key-exchange schemes. Key-exchange schemes involving authenticating a user to a server based on a weak password, and subsequently deriving a shared cryptographic key, are discussed in: "Efficient Password-Authenticated Key Exchange Using Human-Memorable Passwords", Katz et al., EUROCRYPT 2001; and "Universally Composable Password-Based Key Exchange", Canetti et al., EUROCRYPT 2005. In these schemes, the resulting key is shared by both the user computer and server, and if the server is compromised then the user's password is vulnerable to an offline brute-force attack.

Further work addressed the above problem by using a plurality of servers, all of which must be compromised before an attacker can mount an offline brute-force attack against the server. Examples are described in: "Two-Server Password-Only Authenticated Key Exchange", Katz et al., Applied Cryptography and Network Security 2005; and "Practical yet universally composable two-server password-authenticated secret sharing", Camenisch et al., ACM CCS 2012, where the user himself chooses a strong cryptographic key which he can retrieve with the help of his password from two servers. Both servers need to be compromised before the user's password is exposed. Also, U.S. Pat. No. 6,829,356 B1 discloses a client-server system for generating a strong secret such as a cryptographic key from a user password and an ephemeral client secret via interaction of the client and a plurality of servers. These include secret-holding servers, which hold respective secrets for use in generating the key, and verification servers to which the client subsequently proves successful generation of the key. U.S. Pat. No. 7,359,507 B2 describes further variations of the foregoing scheme employing expensive integer arithmetic.

Improved password-based key-generation schemes would be highly desirable.

One embodiment of an aspect of the present invention provides a method for generating, at a user computer connectable to a server via a network, a secret cryptographic key of the user computer. The method comprises:

providing at the user computer a secret user value;

providing at the server a secret server value and a check value which encodes the secret user value and a user password;

at the user computer, in response to input of an input password, encoding the secret user value and the input password to produce a first value corresponding to said check value, and communicating the first value to the server via the network;

at the server, in response to communication of the first value, comparing the first value and the check value to check whether the input password equals the user password and, if so, encoding the first value and said secret server value to produce a second value and communicating the second value to the user computer via the network; and at the user computer, in response to communication of the second value, generating the secret cryptographic key by encoding the second value, the input password and the secret user value.

Methods embodying the invention may provide for secure password-based generation of a secret key of a user computer via interaction with a single server. The key can be generated whenever needed on input of a valid password. The server can check whether the input password is correct and only then will send the user computer the information necessary for key generation. The server never learns either the user password or the key. Through use of the various values in operation of the protocol, the key can be efficiently generated in a manner which is secure against offline password guessing attacks in the event that either the server or the user computer is compromised. Moreover, methods embodying the invention can be implemented using simple, inexpensive arithmetic operations. Embodiments of the invention thus offer elegant and eminently practical systems for secure generation of secret keys.

The secret user value and secret server value may comprise random values or any (preferably cryptographically strong) secrets known only to the user computer and server respectively. These secret values may be provided as a result of pre-storing in memory of their respective devices, or may be actively provided via steps performed in preferred methods embodying the invention, e.g. during a set up procedure. In particular, preferred methods include, in a setup procedure and prior to generation of said key:

at the user computer, in response to input of said user password, encoding the secret user value and the user password to produce said check value, and communicating the check value to the server via the network; and at the server, storing the received check value.

The set up procedure may conveniently include, at the user computer, generating and storing the secret user value, and, at the server, generating and storing the secret server value. Such a setup procedure may comprise independent setup operations for the server and user computer. The setup procedure may also include generation of the key for the first time. In particular, the setup procedure may include:

at the server, encoding said received check value and said secret server value to produce said second value and communicating the second value to the user computer via the network; and at the user computer, in response to communication of the second value, generating the secret cryptographic key for a first time by encoding the second value, the user password and the secret user value, using the key in a cryptographic operation, and deleting the user password, the check value, the second value and the key after use.

The first use of the key in the set up procedure can then define the key required for use in subsequent cryptographic operations, e.g. for decrypting a disc encrypted using the key generated in the setup procedure. The key can be regenerated by the user when required without the need to store information which could be used by an attacker to obtain the key or password by unauthorized use of the user computer.

Preferred methods may further include:

providing at the user computer a user identifier for uniquely identifying the user computer to the server;

at the server, providing the user identifier with the check value for the user computer; and at the user computer, communicating the user identifier to the server with said first value.

Such a user identifier may in general comprise one or more elements. For ease of implementation and enhanced security, the user identifier may also be used in encoding processes performed in the key generation operation. Preferred methods may therefore include: at the user computer, encoding the user identifier in at least one, and preferably both, of the first value and the cryptographic key; and/or at the server, encoding the user identifier in the second value. Particularly preferred methods also include:

at the server, providing a server identifier for uniquely identifying the server to the user computer;

at the user computer, retrieving the server identifier and encoding the server identifier in said first value;

at the server, encoding the server identifier in the second value; and at the user computer, encoding the server identifier in the cryptographic key.

In preferred embodiments, therefore, the various values communicated for implementation of the protocol contain information uniquely identifying computer-server pair. The user computer may retrieve the server identifier by obtaining this identifier from any convenient location. Depending on implementation, the server, identifier may, for instance, be obtained dynamically from the server or pre-stored at the user computer.

For secure key management in typical applications, the key and sensitive protocol data can be deleted after use since the key can be regenerated whenever required by the authorized user. Hence, an embodiment of a second aspect of the invention provides a method for managing, at a user computer connectable to a server via a network, a secret cryptographic key of the user computer. The method may comprise: generating the secret cryptographic key by a method according to the first aspect of the invention; and, at the user computer, using the secret cryptographic key in a cryptographic operation, and deleting the input password, the first value, the second value and the key after use. The key may, for example, be used to decrypt data previously encrypted using the key at the user computer.

An embodiment of a third aspect of the invention provides a method for encrypting and decrypting data, at a user computer connectable to a server via a network, using a secret cryptographic key of the user computer. The method may comprise:

generating the secret cryptographic key by a method according to the first aspect of the invention wherein the key is generated for a first time during a setup procedure as described above;

on generating the key for the first time at the user computer, using the key to encrypt data stored on the user computer; and on generating the key after said first time at the user computer, using the key to decrypt said data stored on the user computer.

An embodiment of a fourth aspect of the invention provides a user computer for communicating with a server via a network to generate a secret cryptographic key of the user computer, said server storing a secret server value and a check value which encodes a secret user value of the user computer and a user password. The user computer may comprise memory for storing said secret user value, a user interface, a communications interface for communicating with the server via the network, and control logic adapted:

in response to input via said user interface of an input password, to encode said secret user value and the input password to produce a first value corresponding to said check value, and to communicate the first value to the server via said communications interface; and in response to communication by the server of a second value produced by encoding the first value and said secret server value, to generate the secret cryptographic key by encoding the second value, the input password and the secret user value.

An embodiment of a fifth aspect of the invention provides a server for use in generating a secret cryptographic key of a user computer, storing a secret user value, which is connectable to the server via a network. The server may comprise:

memory for storing a secret server value and a check value which encodes said secret user value and a user password;

a communications interface for communicating with the user computer via the network; and control logic adapted, in response to receipt from the user computer of a first value which corresponds to said check value and encodes said the secret user value and an input password, to compare the first value and the check value to check whether said input password equals said user password and, if so, to encode the first value and said secret server value to produce a second value, and to communicate the second value to the user computer via said communications interface.

The invention further provides a system comprising a user computer according to embodiments of the fourth aspect of the invention and a server according to embodiments of the fifth aspect of the invention.

Further aspects of the invention provide a computer program and computer program product.

Where features are described herein with reference to an embodiment of one aspect of the invention, corresponding features may be provided in embodiments of another aspect of the invention as appropriate.

Preferred embodiments of the invention will now be described, by way of example, with reference to the accompanying drawings in which.

Figure 1:
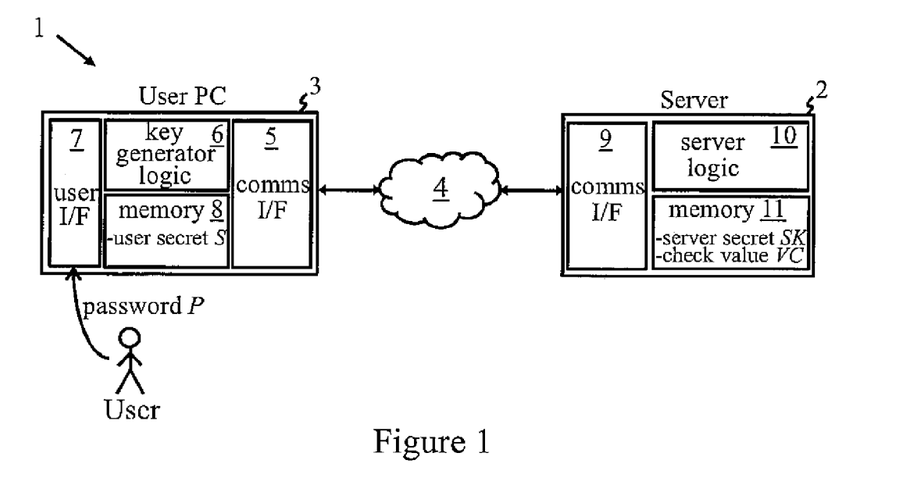
FIG. 1 is a schematic illustration of a data processing system for implementing a key-generation method embodying the invention.

FIG. 1 shows an exemplary data processing system 1 for implementing a key-generation scheme embodying the invention. The system 1 comprises a server 2 and a user computer 3 adapted for communication over a data communications network 4. Network 4 may in general comprise one or more component networks or internetworks, including the Internet. In this example, user computer 3 is implemented by a general-purpose PC (personal computer), and server 2 is embodied as a general-purpose computer implementing server functionality for communication with remote computers over network 4. User PC 3 is shown simply here as comprising a communications interface 5 for communicating with server 2 over network 4, key-generator logic 6 providing functionality for use in the key-generation scheme to be described, a user interface 7 for data input/output interactions with the PC user, and memory 8. Memory 8 stores data used by key-generator logic 6 in operation of the key-generation scheme. This includes a secret user value, denoted by user secret S, which is secret to user PC 3. Server 2 is shown comprising a communications interface 9, server logic 10 providing functionality for use in the key-generation scheme detailed below, and memory 11 which stores data used by logic 10 in operation. This includes a secret server value, denoted by server secret SK, which is secret to the server 2, and a check value VC as described further below.

In general, the key-generation logic 6 and server logic 10 could be implemented in hardware or software or a combination thereof. In this example, key-generation logic 6 is conveniently implemented by software running on user computer 3 for causing the computer to perform the functions detailed below. Similarly, server logic 10 is conveniently implemented by software for controlling computer 2 to implement the functionality described.

The key-generation method implemented by system 1 allows the user PC 3 to generate a (strong) cryptographic key K, which is secret to the user PC, with the cooperation of server 2. Successful generation of the key K requires input by the user of a (weak) user password P at user computer 3. The key can only be generated if the server 2 has verified that the user password is correct.

Figure 2:
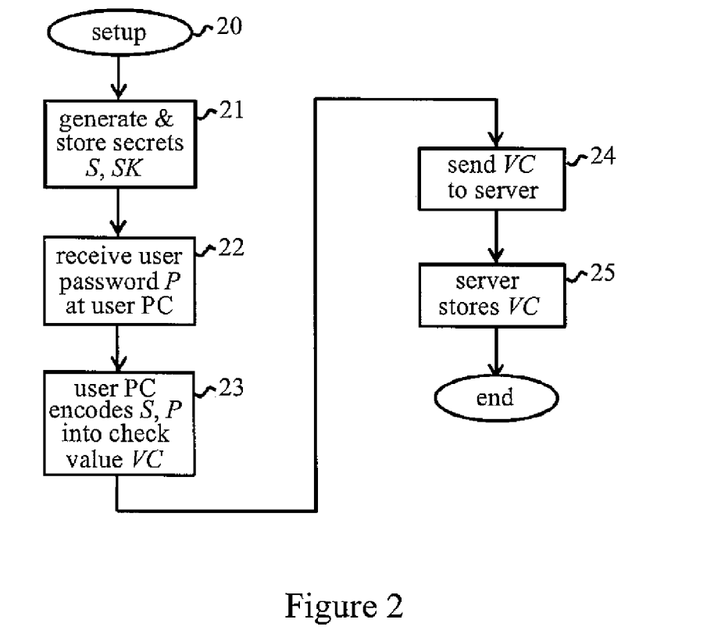
FIGS. 2 and 3 indicate steps performed in operation of the key-generation method.
Figure 3:
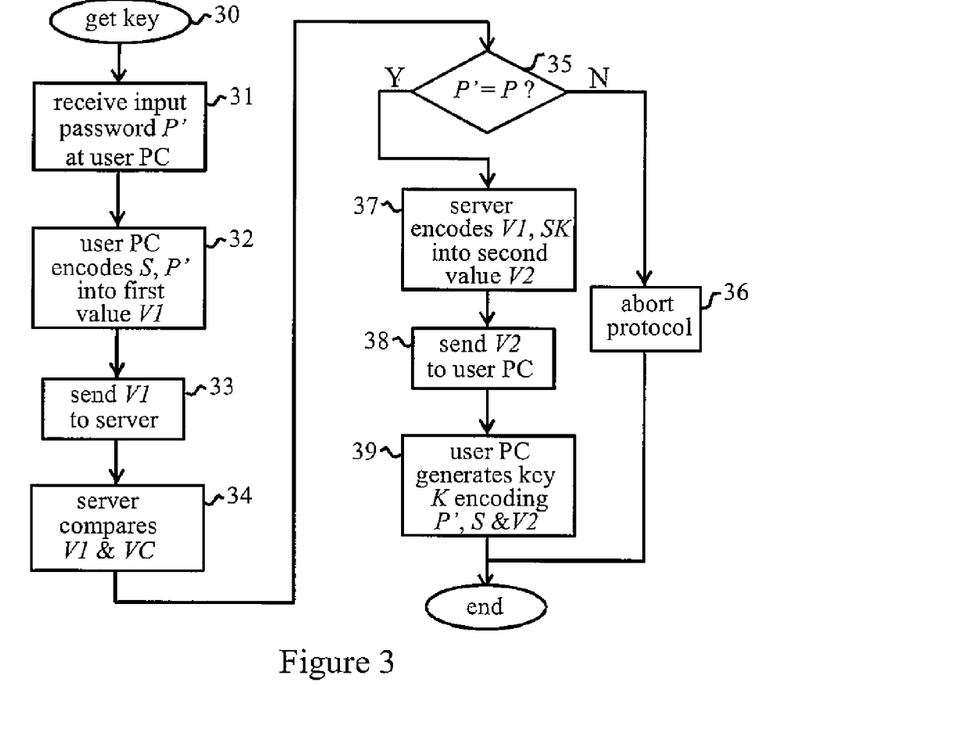

FIGS. 2 and 3 give an overview of the key-generation scheme in the form of respective flow-charts indicating the main steps performed in operation of the scheme. FIG. 2 indicates steps performed in a setup procedure, and FIG. 3 indicates steps of the subsequent key-generation method. Referring first to FIG. 2, after commencement of the setup procedure as indicated at step 20, the user secret S and server secret SK are generated and stored by the user PC and server respectively. This process, represented by step 21, may be performed by random generation in logic 6, 10 respectively of cryptographically strong values, i.e. values having sufficient entropy (sufficient cryptographically random bits) to make it infeasible for an attacker to guess the values. Next, as indicated at step 22, a user password P is input by the user via user I/F 7 of PC 3 and received by key-generator logic 6. In response, logic 6 encodes (at least) the user secret S and the user password P to produce a check value VC. The check value may be generated using any desired algorithm, and particular examples will be given below. In step 24, the check value VC is communicated via interface 5 to server 2 over network 4. (In general, where any value is described herein as communicated to a device, the value may be sent as such (preferably after encryption for security during transmission), or may be embedded in some other function such that the value can be deduced by the receiving device). The check value VC is received by server logic 10 via interface 9, and in step 25 the check value for the user PC 3 is stored in server memory 11. This completes the setup steps required for subsequent key generation. In some applications, however, the setup procedure may include generating and using the key K for the first time. A particular example will be described below. Moreover, as illustrated by that example, the setup procedure of FIG. 2 may be implemented in practice via independent setup operations for the server 2 and user PC 3.

Referring now to FIG. 3, on commencement of the key-generation operation as indicated at step 30, the user inputs a password attempt P' at user PC 3 in step 31. In response to the input password P', in step 32 the logic 6 encodes the input password P' and the user secret S from memory 8 to produce a first value V1 corresponding to the check value VC. The first value V1 is produced here in like manner to the check value VC, using the same encoding algorithm, but uses the input password P' in place of the user password P input for the setup procedure. In step 33, the first value V1 is then communicated to server 2 via network 4. On receipt of V1, in step 34 the server logic 10 compares the first value V1 and the check value VC stored in memory 11 to check whether the input password P' equals the user password P. In particular, if the input password is correct here, then the two values V1 and VC will be identical. If the input password P' is incorrect (represented by "No" (N) at decision block 35) then the server logic aborts the key-generation protocol, as indicated at step 36, and the process terminates. If, however, the input password is correct ("Yes" (Y) at decision block 35), server logic 10 encodes (at least) the first value V1 (which is the same as VC here) and the server secret SK pre-stored in memory 11 to produce a second value V2 in step 37. As before, any desired encoding algorithm can be employed here and preferred examples are given below. In step 38, the second value V2 is then communicated to user PC 3 via network 4. On receipt of V2, in step 39 the key-generator logic generates the secret cryptographic key K by encoding (at least) the second value V2, the input password P' and the user secret S stored in memory 8. Again, examples of preferred algorithms are given below. The key-generation process is then complete. The key K can be used at user PC 3 as required, and then deleted after use to protect the key against theft or other unauthorized use of PC 3. Control logic 8 also deletes the input password P', the first value and the second value V2 so that only the information necessary for authorized key-generation by the password holder is stored on PC 3.

A preferred implementation of the above scheme will now be described in detail. In this example, the key-generation scheme is utilized in a disc encryption/decryption application where the key K is an encryption key. The protocol includes a setup procedure and a key-generation procedure generally as described above, though the setup procedure is implemented here via independent sub-protocols for setup of the server and user PC. The Server Setup sub-protocol, where the server 2 generates its cryptographic material, is indicated schematically in FIG. 4a. The Device Setup sub-protocol, where the user PC 3 registers itself with the server and first generates the key K, is indicated schematically in FIG. 4b. FIG. 5 is a schematic representation of the subsequent key-generation, or "Retrieve" sub-protocol, where the key K is regenerated by the user computer with the help of the server. For enhanced security in this embodiment, all protocol communications between user PC 3 and server 2 are conducted over a forward-secure channel C with the following properties:

- the channel operates over a communication link;
- the channel allows a first party to send a bit-string of arbitrary length to a second party, and the second party to reply with a bit-string of arbitrary length;
- the second party is authenticated to the first party;
- the bit-strings are sent in a confidential manner and are protected from alteration by a third party;
- the confidentiality of the bit-strings that were sent is not compromised if one or both parties are compromised after the channel was torn down.

These properties of channel C can be achieved in well-known manner, e.g. using SSL (Secure Sockets Layer) or TLS (Transport Layer Security) protocols. As another example, both parties could have a secret shared key which they use to authenticate a Diffie-Hellman key exchange. The key resulting from the key exchange protocol may then be used as the session key for the channel. In the following example, however, the second party (server 2) holds a certificate signed by a trusted certification authority (CA) and the channel C is realized with the TLS protocol over the Internet.

Server Setup

Figure 4A:
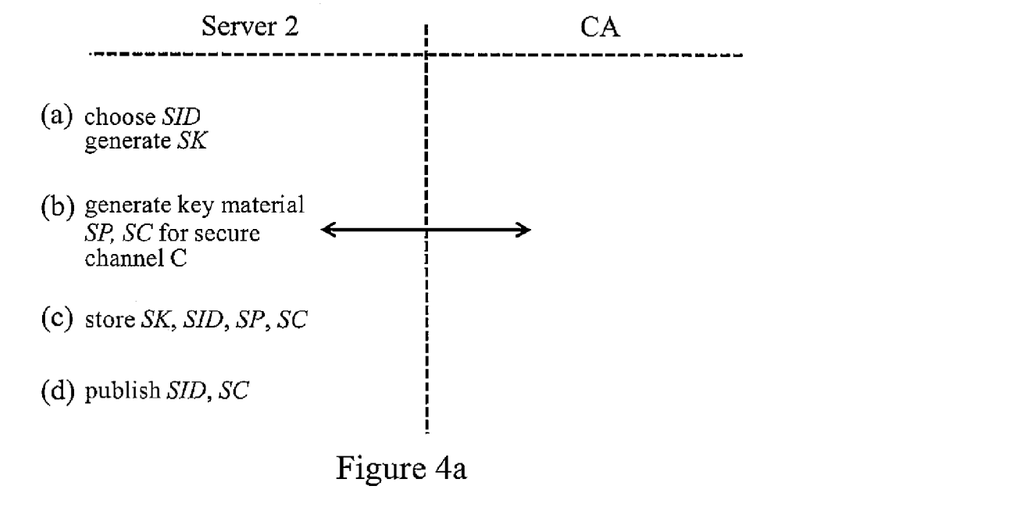
FIGS. 4a and 4b indicate respective setup operations for a server and user computer of the FIG. 1 system in a preferred embodiment of the key-generation method.
Figure 5:
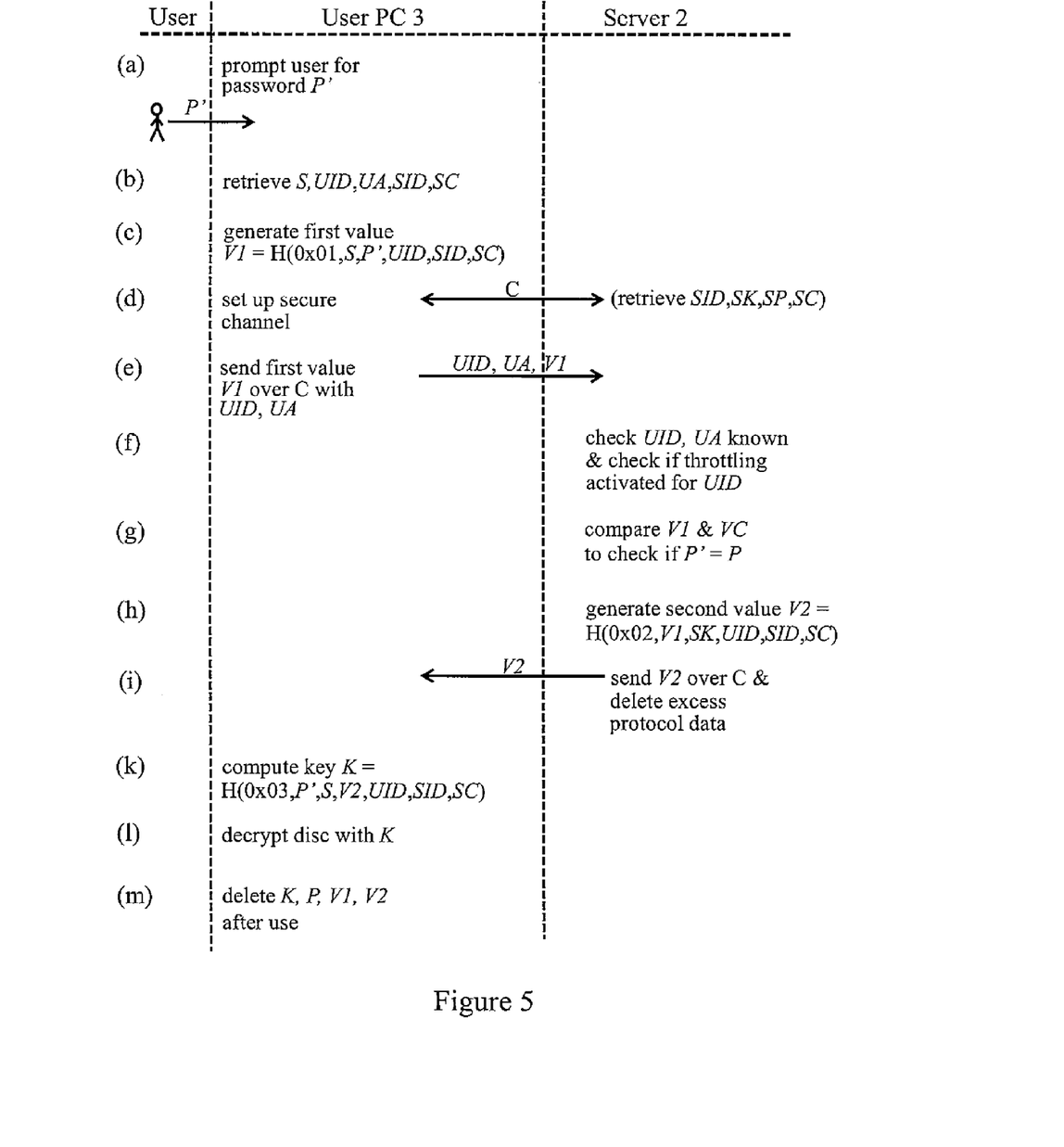
FIG. 5 indicates a key-generation operation with the preferred method.

FIG. 4a illustrates the setup operation for server 2 in terms of interaction between the server and the certification authority CA whose operations are indicated respectively in the left-hand and right-hand columns of the figure. The server runs this sub-protocol once. In step (a), server logic 10 chooses a unique server identifier SID for uniquely identifying the server 2 to the user computers it will serve for key-generation. In addition, the server logic chooses a random server key (server secret SK) containing at least $\eta$ bits of entropy, where $\eta$ is a security parameter which can be set as desired. In this particular example $\eta=128$. In step (b), server logic 10 generates key material that can be used to establish forward-secure channels. Here this comprises a public part SC and a private part (private key) SP, where the public part SC is generated via interaction with the certification authority CA and comprises a certificate on a public key corresponding to private key SP. In step (c) the server stores SK, SID, SC and SP in its internal storage 11. In step (d) the server publishes the certificate SC together with its server identifier SID, whereby (SID, SC) is made available to computers connected to network 4.

Device Setup

Figure 4B:
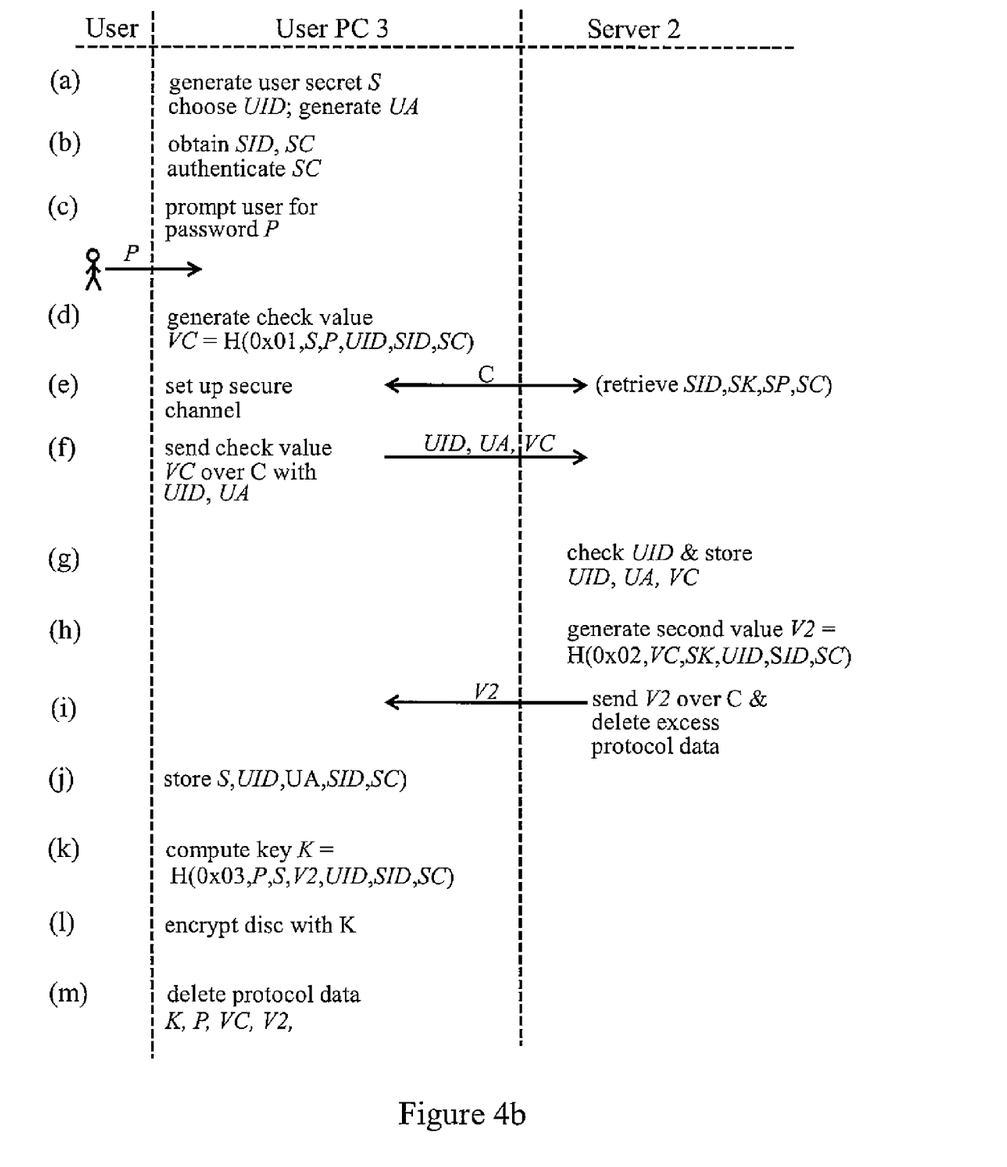

FIG. 4b illustrates the setup operation for user PC 3 in terms of interaction between the user, the user PC 3, and the server 2 whose operations are indicated respectively in the left-hand, central and right-hand columns of the figure. User PC 3 runs this sub protocol once, after the server 2 has completed the Server Setup above. In step (a), key-generator logic 6 chooses a random secret value (user secret 3) containing at least $\eta$ bits of entropy. The logic 6 also generates identity data which comprises a unique user identifier UID for uniquely identifying the user PC to server 2. Here, the identity data further includes an authenticator UA. The value UA is preferably a cryptographically strong value, and may be a randomly chosen value with at least $\eta$ bits of entropy. As another example, UA could be generated by hashing the user secret S with a collision-resistant hash function. The provision of both UID and UA in this example allows UID to be chosen as a convenient (weak) value, for instance a user name or email address, while UA provides a cryptographically strong value for use in securely identifying the user PC to the server in subsequent protocol steps.

In step (b) of FIG. 4b, user PC 3 retrieves the server identifier SID and server certificate SC for server 2. This data may, for instance, be obtained from server 2 or may be pre-stored on user PC 3 following publication during the server setup. As part of this process, the public certificate SC is authenticated by logic 6 in known manner, (typically using a public key of the certification authority CA). Next, in step (c), logic 6 prompts the user to input a password, in response to which the user inputs the user password P. In step (d), the logic 6 then generates the check value VC by hashing a bit-string comprising the user secret S, the password P, and information that uniquely identifies the PC-server pair, in this case the triplet (UID, SID, SC). In this example, the check value VC is generated as follows:

$$VC \leftarrow H(0x01, S, P, UID, SID, SC)$$

where: H is a collision resistant hash function such as the SHA-256 hash function; and the hexadecimal value 0x01 (and corresponding values in functions given below) are included to ensure that there is no ambiguity as to which step of the protocol the bit-string to be hashed corresponds to.

In step (e) of FIG. 4b, the device and the server set up a forward-secure channel C obtained from the server certificate SC, the server retrieving its stored values SK, SID, SC and SP from memory 11 during this process. In step (f), the user PC sends the identity data UID, UA with the check value VC to server 2 over the channel C. On receipt in step (g), the server logic 10 checks that the user identifier UID is unique, i.e. that it has never seen UID before. If UID is not unique, the server logic erases all data not explicitly required to be stored in memory 11 above (i.e. all data other than SK, SID, SC and SP) and aborts the protocol. A suitable error message may be sent to PC 3 in this event. Assuming UID is unique, the server stores the triplet (UID, UA, VC) in memory 11. Next, in step (h), the server logic computes the second value V2 by hashing a bit-string comprising the check value VC, the server secret SK, and information that uniquely identifies the PC-server pair, here the triplet (UID, SID, SC). In this example, the second value V2 is generated as follows:

$$V2 \leftarrow H(0x02, VC, SK, UID, SID, SC)$$

In step (i), the server sends V2 to user PC 2 over the channel C, and then erases all data not explicitly required to be stored in memory 11 above.

On receiving the second value V2 in step (j), logic 6 of user PC 3 stores S, UID, UA, SID, and SC in its internal storage 8. In step (k), the logic 6 then computes the strong cryptographic key K for a first time by hashing a bit-string comprising the user password P, the second value V2, and the user secret S, here together with the triplet (UID, SID, SC) uniquely identifying the PC-server pair. In this example, the key K is generated as follows:

$$K \leftarrow H(0x03, P, S, V2, UID, SID, SC)$$

In this scenario, the logic 6 then uses the key in step (l) to encrypt the hard disc of PC 3. After using the key, in step (m) the logic 6 erases all data (including the key K, the password P, the check value VC and the second value V2) not explicitly required to be stored in memory 8 above. This action is conveniently performed upon shutdown of PC 3.

Retrieve Key

FIG. 5 illustrates the retrieve sub-protocol for regenerating the key at user PC 3. This sub-protocol may be run multiple times after the user PC and server have completed the setup sub-protocols above. In step (a) of this operation, logic 6 prompts the user to input a password, in response to which the user inputs a password attempt P'. In step (b), the logic 6 retrieves S, UID, UA, SID, and SC from memory 8. In step (c) logic 6 then computes the first value V1 corresponding to the check value VC as:

$$V1 \leftarrow H(0x01, S, P', UID, SID, SC)$$

Next, in step (d), the device and the server set up a forward-secure channel C obtained from the server certificate SC, the server retrieving its stored values SK, SID, SC and SP from memory 11 during this process. In step (e), the user PC sends the identity data UID, UA with the first value V1 to server 2 over the channel C. On receipt in step (f), the server logic 10 checks that it has previously stored a triplet where the first two items are UID, UA. If no such triplet is found, the server will erase all data not explicitly required to be stored in memory 11 above and abort the protocol. The server logic also checks whether a throttling mechanism maintained by the server for UID has been activated. Throttling mechanisms are well known in cryptography, providing procedures for monitoring logins by system users and determining based on login behavior if any particular user account should be blocked. Throttling mechanisms generally block user accounts if the login behavior satisfies a predefined criterion indicative of potentially malicious action. In this example, the throttling mechanism may be activated for a UID if more than a threshold number of retrieve requests are made for the UID within a given time and/or with an incorrect password. If the throttling mechanism is activated for UID, the server logic will refuse to service this retrieve request and sends an error message such as "connection was throttled" back to user PC 2. The server can erase all data not explicitly stored in memory 11 above and abort the protocol. Upon receiving such an error message, the logic 6 of PC 3 may erase all data not explicitly stored in memory 8 above and abort the protocol.

Assuming all checks are passed in step (f), then in step (g) the server checks that the third element VC in the stored triplet for UID, UA is equal to the received first value V1. If not, the server can send an "incorrect password" message to the PC 3 over channel C. The server and PC can then erase all inessential protocol data as before and abort the protocol. The throttling mechanism of server logic 10 will also record this incorrect-password event to determine if the account should be throttled for subsequent implementations of step (f) above.

Assuming the password P' is deemed valid in step (g), the next steps correspond generally to equivalent steps of the device setup operation above. Hence, in step (h), the server logic computes the second value V2 as:

$$V2 \leftarrow H(0x02, V1, SK, UID, SID, SC)$$

In step (i), the server sends V2 to user PC 2 over the channel C, and then erases all inessential data as before. On receiving the second value V2 in step (i), logic 6 computes the key K as:

$$K \leftarrow H(0x03, P', S, V2, UID, SID, SC)$$

The logic 6 then uses the key in step (j) to decrypt the hard disc of PC 3. When the device no longer needs the key, in step (l) the logic 6 erases all inessential data as before. Again, this action is conveniently performed upon shutdown of PC 3.

It will be seen from the foregoing that the secret cryptographic key K can be generated whenever needed by PC 2 on user input of a valid password. The information necessary to generate the key can be obtained by the user PC only if (1) the user enters the correct password, and (2) the server has checked the validity of the password. Furthermore, the above scheme guarantees that both the password and the encryption key remain secure if either the user PC is stolen or the server is compromised. In particular, the information stored on the user PC together with the protocol messages do not allow for an offline password guessing attack. Similarly, the information stored by the server together with the protocol messages do not allow for an offline password guessing attack. In order to extract information about the key, it is necessary to know the information stored by the user PC, know the password, and either (1) know the information stored by the server, or (2) ensure cooperation of the server. The expense and complexity of using multiple servers or trusted hardware as in prior systems is avoided, and the system can be implemented with inexpensive arithmetic operations such as hash functions. Moreover, throttling at the server 2 can be based on incorrect password entry, providing highly effective protection against online attacks. The scheme thus offers a secure and practical system for generating a secret key of a user computer through interaction with only one server.

While exemplary embodiments have been described above, many alternatives and modifications can be envisaged. For example, other embodiments may employ different encoding algorithms for generating values used in the protocol. Other convenient examples include password-based key derivation functions, such as the PBKDF2 (as published by Internet Engineering Task Force's RFC 2898) or bcrypt (described in "A Future-Adaptable Password Scheme", Niels Provos and David Mazières, USENIX 1999) algorithms. In general, values indicated as encoding specified elements may additionally encode further elements, and communications may convey elements other than those specifically itemized.

The key K generated in other embodiments may be used for encryption/decryption of any stored data or for cryptographic operations other than encryption/decryption. Secret user computer keys may, for instance, be used for authenticating the user computer to some third party or for signing messages.

While a simple data processing system 1 is described for illustrative purposes above, various other forms of data processing system can be envisaged.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for generating, at a user computer connectable to a server via a network, a secret cryptographic key of the user computer, the method comprising:
   providing at the user computer a secret user value;
   providing at the server a secret server value and a check value which encodes the secret user value and a user password;
   at the user computer, in response to input of an input password, encoding the secret user value and the input password to produce a first value corresponding to said check value, and communicating the first value to the server via the network;
   at the server, in response to communication of the first value, comparing the first value and the check value to check whether the input password equals the user password and, if so, encoding the first value and said secret server value to produce a second value and communicating the second value to the user computer via the network; and
   at the user computer, in response to communication of the second value, generating the secret cryptographic key by encoding the second value, the input password and the secret user value.

2. A method as claimed in claim 1 including, in a setup procedure, prior to generation of said key:

at the user computer, in response to input of said user password, encoding the secret user value and the user password to produce said check value, and communicating the check value to the server via the network; and at the server, storing the received check value.

3. A method as claimed in claim 2 including, in said setup procedure:

at the user computer, generating and storing the secret user value; and at the server, generating and storing the secret server value.

4. A method as claimed in claim 2 wherein the setup procedure includes:

at the server, encoding said received check value and said secret server value to produce said second value and communicating the second value to the user computer via the network; and at the user computer, in response to communication of the second value, generating the secret cryptographic key for a first time by encoding the second value, the user password and the secret user value, using the key in a cryptographic operation, and deleting the user password, the check value, the second value and the key after use.

5. A method as claimed in claim 1 including:

providing at the user computer a user identifier for uniquely identifying the user computer to the server;

at the server, providing the user identifier with the check value for the user computer; and at the user computer, communicating the user identifier to the server with said first value.

6. A method as claimed in claim 5 including, at the user computer, encoding the user identifier in the first value.

7. A method as claimed in claim 5 including, at the user computer, encoding the user identifier in the cryptographic key.

8. A method as claimed in claim 5 including, at the server, encoding the user identifier in the second value.

9. A method as claimed in claim 6 including:

at the server, providing a server identifier for uniquely identifying the server to the user computer;

at the user computer, retrieving the server identifier and encoding the server identifier in said first value;

at the server, encoding the server identifier in the second value; and at the user computer, encoding the server identifier in the cryptographic key.

10. A method as claimed in claim 1 including establishing, via interaction of the user computer and the server, a secure channel over said network, wherein said communicating by the user computer and server is conducted over the secure channel.

11. A method as claimed in claim 1 including, at the server, implementing a throttling mechanism in dependence on whether the input password equals the user password.

12. A method as claimed in claim 1 wherein:

the check value encodes the secret user value and the user password via a hash function;

the user computer produces the first value by encoding the secret user value and the input password via said hash function;

the server produces the second value by encoding the first value and the secret server value via said hash function; and the user computer generates the secret cryptographic key by encoding the second value, the input password and the secret user value via said hash function.

13. A computer program product, the computer program product comprising a non-transitory computer readable storage medium having program instructions embodied therewith, the program instructions executable by a computer to cause the computer to perform:

providing at the user computer a secret user value;

providing at the server a secret server value and a check value which encodes the secret user value and a user password;

at the user computer, in response to input of an input password, encoding the secret user value and the input password to produce a first value corresponding to said check value, and communicating the first value to the server via the network;

at the server, in response to communication of the first value, comparing the first value and the check value to check whether the input password equals the user password and, if so, encoding the first value and said secret server value to produce a second value and communicating the second value to the user computer via the network; and at the user computer, in response to communication of the second value, generating the secret cryptographic key by encoding the second value, the input password and the secret user value.

14. A user computer for communicating with a server via a network to generate a secret cryptographic key of the user computer, said server storing a secret server value and a check value which encodes a secret user value of the user computer and a user password, wherein the user computer comprises memory for storing said secret user value, a user interface, a communications interface for communicating with the server via the network, and control logic adapted:

in response to input via said user interface of an input password, to encode said secret user value and the input password to produce a first value corresponding to said check value, and to communicate the first value to the server via said communications interface; and in response to communication by the server of a second value produced by encoding the first value and said secret server value, to generate the secret cryptographic key by encoding the second value, the input password and the secret user value.

15. A server for use in generating a secret cryptographic key of a user computer, storing a secret user value, which is connectable to the server via a network, the server comprising:

memory for storing a secret server value and a check value which encodes said secret user value and a user password;

a communications interface for communicating with the user computer via the network; and control logic adapted, in response to receipt from the user computer of a first value which corresponds to said check value and encodes said secret user value and an input password, to compare the first value and the check value to check whether said input password equals said user password and, if so, to encode the first value and said secret server value to produce a second value, and to communicate the second value to the user computer via said communications interface.

* * * * *